FORD & PENQUITE.
Potato-Digger.
No. 52,984. Patented Mar. 6, 1866.
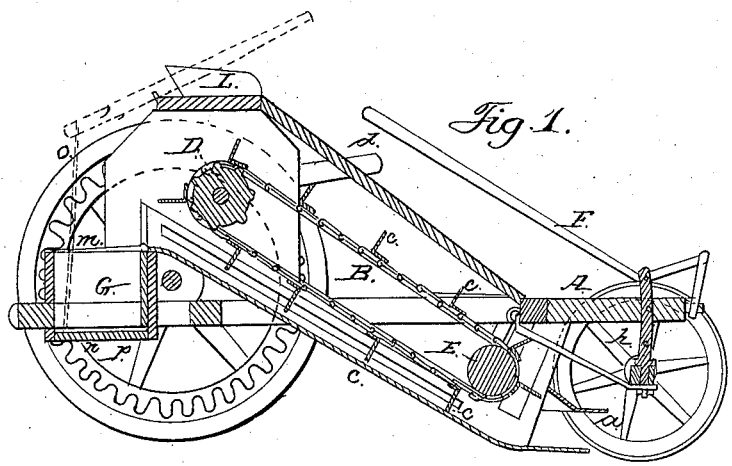
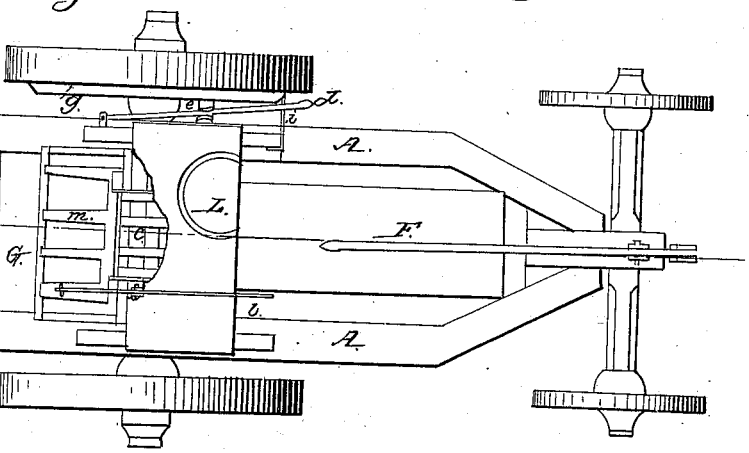
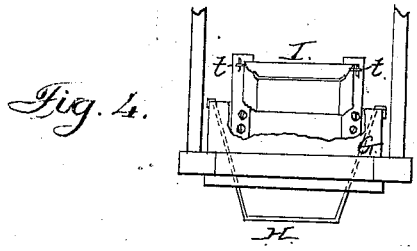
WITNESSES:
Geo. Burgess.
P. L. Dodge.
INVENTORS:
E. J. Ford &
J. F. Penquite
By W. C. Dodge
Attorney

UNITED STATES PATENT OFFICE.

E. G. FORD AND J. F. PENQUITE, OF DELPHOS, OHIO.

IMPROVEMENT IN POTATO-DIGGERS.

Specification forming part of Letters Patent No. 52,984, dated March 6, 1866.

*To all whom it may concern:*

Be it known that we, E. G. FORD and J. F. PENQUITE, of Delphos, in the county of Van Wert and State of Ohio, have invented certain new and useful Improvements in Machines for Digging Potatoes; and we do hereby declare that the following is a clear, full, and exact description thereof, reference being had to the accompanying drawings, making part of this specification, and to the letters of reference marked thereon.

Figure 1 is a longitudinal vertical section. Fig. 2 is a top-plan view, and Figs. 3 and 4 are portions of the same shown detached.

To enable others skilled in the art to construct and use our invention, we will proceed to describe it.

A represents the frame or body of the machine, which is mounted on wheels at front and rear, similar to a wagon, the frame at the front end being attached to the front axle by a standard, $h$, which has its lower end pivoted in the axle, its upper end passing through a hole in the frame, and is pivoted at its upper end to a lever, F, which is also pivoted at its front end to the front part of the frame A, its rear end extending back so as to be within reach of the driver, who sits on the seat L. By these means the front end of the frame can be raised or lowered as desired, a bolt being placed in any of the holes in $h$, serving to keep it fixed in that position when once adjusted.

C represents an inclined slotted chute having slotted sides, up which the potatoes are forced by the wings $c$, attached to the endless belt B, passing around the pulleys D and E, as shown in Fig. 1. At the front end this chute is provided with two pointed horizontal shares, $a$ and $b$, the upper one of which serves to cut away the vines, weeds, &c., while the lower one, $b$, takes up the earth in which the potatoes are embedded, causing it, with the potatoes, to enter upon the chute C, where they are separated, the loose earth falling through the slots or spaces in the bottom and sides of the chute C, while the potatoes are swept or forced up the incline and fall off its rear end into the box G suspended at the rear of the machine, as shown in Fig. 1.

To one of the rear wheels of the machine an internally-geared wheel, $g$, is secured, as shown in Fig. 1, and on the end of shaft $e$, on which pulley D is mounted, is placed a pinion, arranged to gear into the wheel $g$, by which motion is imparted to the belt B. The pinion on shaft $e$ is arranged to slide on the shaft, so that by means of the lever $d$ it can be thrown in or out of gear with wheel $g$, as may be desired.

A coarse screen, $m$, is pivoted or hinged in such a position as to lie over the top of box G, to receive the potatoes as they come from the rear end of the chute C, its object being to prevent any large lumps of earth, clods, stones, &c., from entering the box G with the potatoes in case any should chance to enter the chute.

The bottom $n$ of the box G is pivoted at $p$, the pivot being located nearest one edge of the bottom, as shown in Fig. 1, so that when closed, with its front beveled edge resting upon the beveled cleat, as shown, it will remain closed. A rod, $o$, is attached to the pivoted bottom $n$, and, passing up through the box G, is also attached to the pivoted screen $m$. From thence it extends up to the rear end of lever $l$, which is pivoted to the top of the machine in a position to bring its front end within reach of the driver, as shown in Figs. 1 and 2, by which the bottom can be raised and the potatoes allowed to fall in heaps at pleasure.

One of the rear wheels is mounted loosely upon the axle, a pawl or catch being placed within the hub in such a position as to engage in a notch or recess in the axle, thus leaving the wheel free to move in one direction loosely on the axle, while in the opposite direction it can only turn with the axle, this arrangement being shown in Fig. 3, the other wheel being attached rigidly to the axle.

When it is desired to put the potatoes into sacks the screen $m$ is removed by simply withdrawing the rod on which it is pivoted, and also the bottom $n$ of box G, and the platform H is inserted within the box G, where it is held suspended by having its upper ends hook over the sides of the box, as shown in Fig. 4. A converging mouth-piece or spout, I, is hooked onto the frame at the rear end of the chute C, and a bag having its open end placed under this spout stands upon the bottom of H and receives the potatoes as they fall through the spout I. This spout is held in place by staples and hooks, as shown at $t$, Fig. 3.

Having thus fully described our invention, what we claim is—

1. The chute C, having its sides and bottom slotted, as described, in combination with the horizontal shares $a$ and $b$, and the belt B, provided with the wings $c$, all arranged to operate as herein described.

2. The combination of box G, having it bottom pivoted, as shown, with the pivoted screen $m$, rod $o$, and lever $l$, arranged as shown and described.

3. The combination and arrangement of the frame A, lever E, and standard $h$, pivoted to the front axle, as shown.

4. The combination, with the chute C and belt B, of the spout I and the suspended platform H, arranged and operating as and for the purpose set forth.

ELIJAH G. FORD.
JAMES F. PENQUITE.

Witnesses:
 H. WEIBLE,
 J. B. GREEN.